July 23, 1963

C. C. CASSADY 3,098,471

SLIDING VANE ROTARY PISTON ENGINE AND
COMPRESSION SEALS THEREFOR

Filed Oct. 27, 1960

Cecil C. Cassady
INVENTOR.

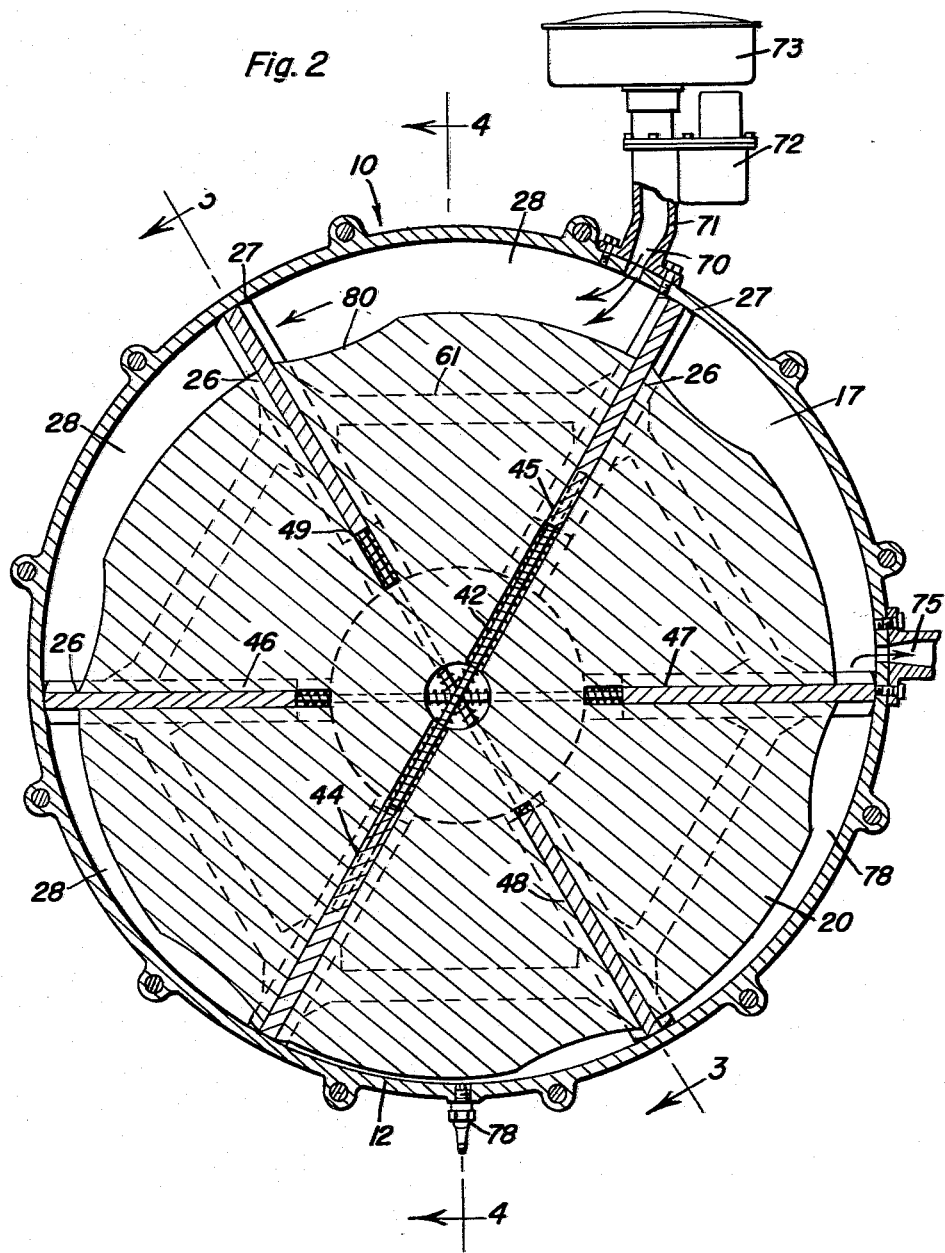

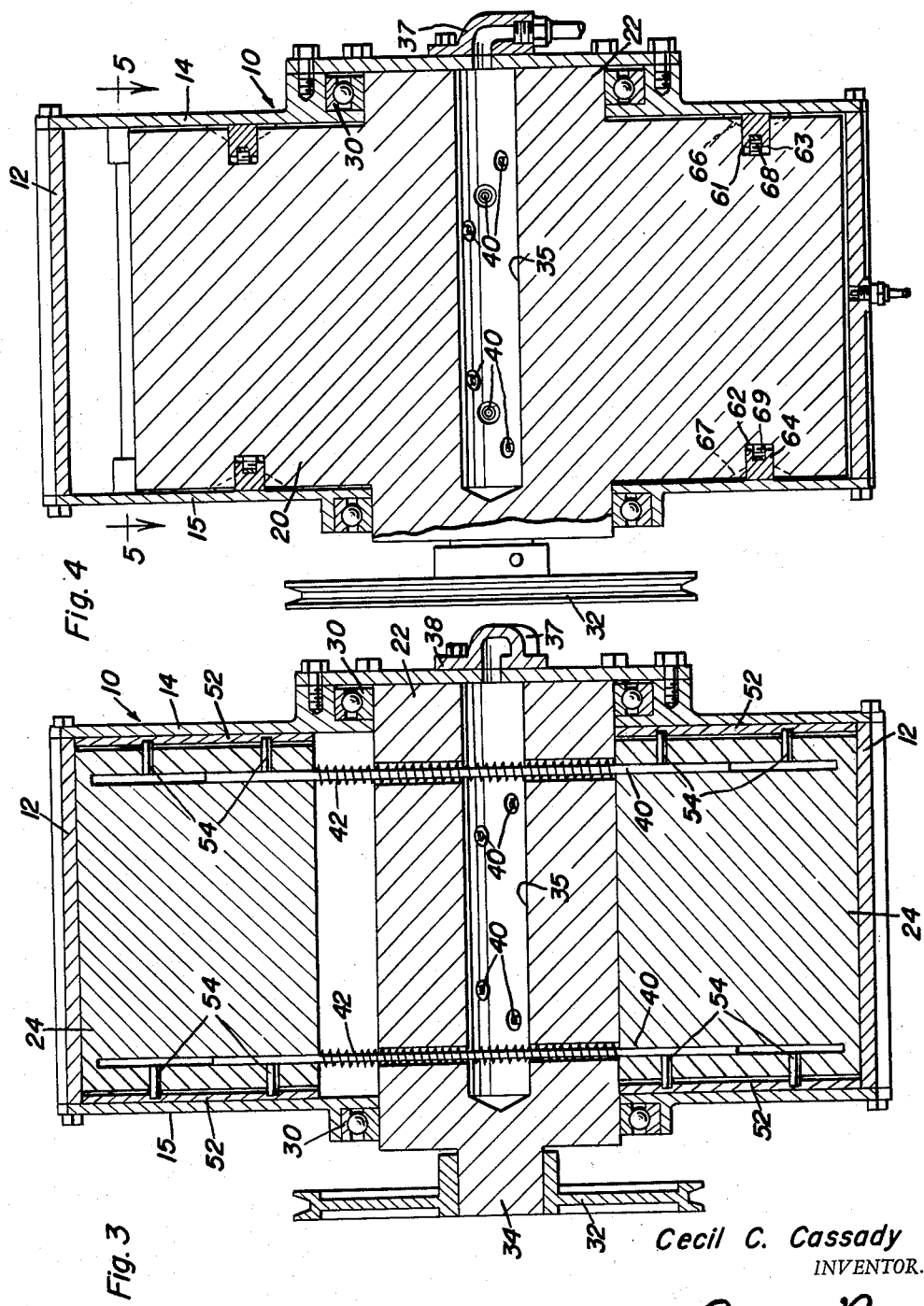

United States Patent Office 3,098,471
Patented July 23, 1963

3,098,471
SLIDING VANE ROTARY PISTON ENGINE AND
COMPRESSION SEALS THEREFOR
Cecil C. Cassady, 3001 Estero Blvd., Fort Myers, Fla.
Filed Oct. 27, 1960, Ser. No. 65,438
8 Claims. (Cl. 123—16)

The present invention comprises a rotary engine of improved design construction, and particularly with respect to the sealing mechanism which permits smooth and efficient operation of the engine.

Rotary engines have been proposed heretofore and described in patents and publications wherein a rotor carrying a radial abutment or abutments usually referred to as blades is eccentrically mounted in and rotated in the casing with the blades resiliently urged into engagement with the inner peripheral wall of the casing, the latter having predetermined clearances with respect to the rotors and blades to provide combustion chambers for the introduction and burning of fuel which drives the rotor. In such prior rotary engine designs and construction, however, it has been difficult to provide an effective seal for these chambers in which the high pressures must be maintained during compression and burning of the fuel mixture. It has also been a problem of prior rotary engines to provide radial compression blades which effectively seal the internal combustion chambers during operation of the engine without causing undue wear or binding of the rotor blades. Further, in prior rotary engine designs the force or impulse exerted on the rotor blades during operation varied substantially so that a flywheel was required to overcome the uneven forces and provide a smooth operating engine.

It is a principal object of the present invention to overcome the aforementioned difficulties and problems, at least to a large extent, and provide a rotary internal combustion engine of improved construction which may be operated smoothly and efficiently and without the necessity of employing a flywheel.

Another object of the invention is to provide an improved assembly of radial blades slidably mounted upon a rotor in an improved manner and with the blades disposed in pairs of diametrically opposed but interconnected blades.

A further object of the invention is to provide a rotary engine of the character described having improved rotor blade sealing means and wherein provision is made for lubricating the sealing mechanism and the rotary blades. The improved construction provides a non-binding rotor and blade assembly which is long wearing and wherein the sealing of the combustion chambers is continuously maintained even when operating at high speeds and increased pressures.

These and other improved features and advantages of my rotary engine will become apparent in the course of the following description.

For a full understanding of my invention and the merits and advantages in its use, the same will be described in more detail with respect to one embodiment thereof, reference being made to the accompanying drawings, in which:

FIGURE 2 is a vertical sectional view of the rotary engine shown in FIGURE 1 and illustrating the arrangement of the rotor and its radial compression blades in the rotor casing of the engine, certain concealed parts being shown in dotted lines;

FIGURE 3 is a vertical sectional view of the rotary engine taken substantially upon the plane indicated by the section line 3—3 of FIGURE 2, and looking in the direction of the arrows;

Figure 5:
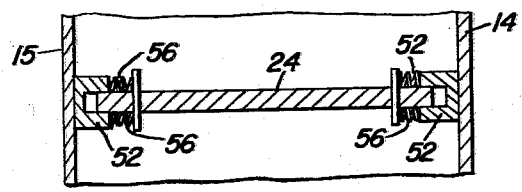

FIGURE 4 is a vertical transverse sectional view taken substantially upon the plane indicated by the section line 4—4 of FIGURE 2 and looking in the direction of the arrows, a drive pulley in this view being shown in elevation; and FIGURE 5 is a fragmentary detail view in section of the radial sealing blade structure taken substantially upon the plane indicated by the section line 5—5 of FIGURE 4 and looking in the direction of the arrows.

Referring to the drawings in more detail and wherein like reference characters indicate like elements throughout the figures, and it being understood that each of the six rotary combustion chambers are of like construction, one is now described in particular detail.

In FIGURES 1-4, the reference character 10 designates a rotary engine having a cylindrically shaped stator or rotor casing 12 which casing is provided with closing side walls or end plates 14 and 15 and suitably secured to the casing as by means of bolts or similar fasteners 16 and which provide the sides of the cylindrical working chamber 17.

Journaled in the casing 12 eccentrically of the cylindrical chamber 17 is a rotor 20, which may be fabricated of metal, such as iron, aluminum, steel or the like. The rotor 20 is fixedly mounted upon or is integral with a central shaft 22 and slidably supports compression blades generally designated 24. The radial blades 24 of which there are six are arranged to slide inwardly and outwardly in their respective radial grooves 26 while in contact at their outer ends with the inner peripheral wall of the casing 12 as shown in FIGURE 2, the outer ends of the blades being rounded as at 27.

The blades 24 are disposed in pairs of diametrically opposed blades and adjacent blades and thus divide the casing into six combustion chambers, generally designated 28.

The rotor shaft 22 is mounted on roller bearings, such as shown at 30, which are provided in the end walls 14 and 15 for journaling the rotor and its associated blade mechanism in the casing. A driving pulley is secured as is shown at 32 to the outer end of the stub shaft 34 of the rotor shaft 22. This rotor structure functions as a flywheel as illustrated in the drawings in FIGURES 3 and 4.

To provide for lubrication of the rotor shaft 22 and associated compression blades and sealing means, the rotor shaft is drilled in the central portion and from one end thereof to form an opening or passage 35 through which lubricating oil may be introduced, the oil being flowed therethrough under pressure or otherwise may be circulated through the engine from a suitable source. The conduit through which lubricating oil is conducted is connected to the engine as by means of a pipe 37 and a connecting housing 38 as shown in FIGURES 3 and 4.

Each of the compression blades 24 is similarly constructed and operated. As illustrated in FIGURES 2 and 3 these blades are slidably mounted in opposed pairs on the opposite ends of pairs of dowel pins 40 extending through the rotor shaft 22. The pairs of dowels are positioned in axially spaced relation along the shaft 22, see FIGURES 3 and 4. The compression blades are urged outwardly of the dowel pins and against the casing wall 12 by spaced pairs of coil springs, such as shown at 42, which are arranged on the pins of the diametrically opposed pairs of the blades. The blades which are 180 degrees apart are designated by blades 44 and 45, the pair of blades 46 and 47 and the pair 48 and 49 and are mounted on spaced pairs of pins as shown in FIGURE 3. As will be seen these blades are urged apart by the spaced sets of coil springs 42. The pins or dowels 40 on which are mounted the coil springs 42 are suitably spaced axially of the shaft so that they do not interfere with each other at the center of the rotor shaft. Coil springs 42 each exert a relatively low constant force which is sufficient to hold the compression blades 24 in sealing engagement with the rotor casing during low or starting speeds of the rotary engine. After starting the engine and increasing the speed of the rotor, the centrifugal force developed causes the compression blades to move outward into sealing contact with the circular wall of the rotor casing 12. In such a construction low tension coil springs 42 may be used to operate the compression blades which results in the provision of a longer lasting and more durable rotary engine.

The compression blades 24 are each also provided with laterally disposed radially extending sealing means which are U-shaped in cross section and embrace the sides of the blades 24 as shown at 52 in FIGURES 3 and 5. Pairs of these side-thrust seating members 52 are slidably mounted on radially spaced dowels or pins 54 such as shown in FIGURE 3, a side thrust force being applied to the members 52 by corrugated metal spring means 56 disposed adjacent each of the dowel pins 54. In the rotor construction each of the compression blades is sealed at its opposite sides to the side walls of the rotor casings 14 and 15.

To seal the opposite walls of the rotor body portion against the casing end walls 14 and 15, pairs of sealing members disposed on opposite sides of the rotor as shown at 61 and 62 in FIGURE 4 are provided which work in slots or grooves 63 and 64 respectively in the rotor. The outer ends of the sealing members 61 and 62 are flared as at 66 and 67 to provide for enlarged surface contact sealing surfaces adjacent the compression blades and thus effectively seal the parts. Each of the sealing members 61 and 62 is yieldingly urged into sealing engagement with the side walls 14 and 15 of the casing 12 by corrugated spring means 68 and 69 respectively, which springs are constructed similarly to the corrugated springs 56. Like sealing means as described is provided for each of the six combustion chambers of the rotary engine, the radial compression blade thus forming circumferentially spaced individually sealed combustion chambers.

The grooves or slots 63 and 64 in the rotor, are interconnected through the grooves and slot openings 26 of the rotor in which are mounted the compression blades 24 and which in turn communicate with the central openings 35 of the rotor whereby lubricating oil can be introduced therein and pumped through the grooves and sealing guide sleeves to maintain the parts thoroughly lubricated. This is an important feature of the invention and greatly lengthens the life of the rotary engine.

Figure 1:
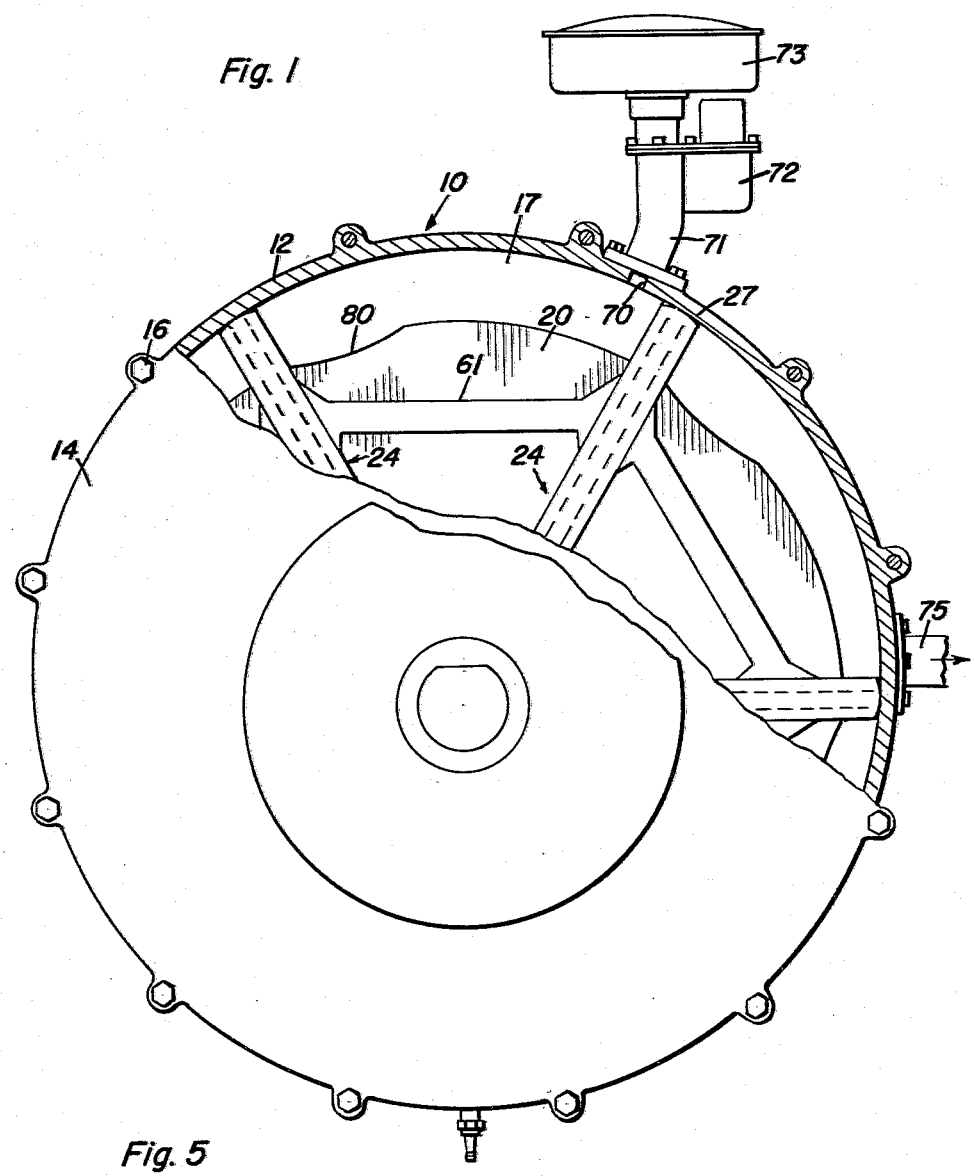
FIGURE 1 is a side elevational view of a rotary engine embodying the invention and shown connected to a conventional carburetor by which fuel is supplied to the combustion chambers, a portion of the casing being shown broken away to better illustrate the structure.

Rotor and compression blade construction provides a structure wherein each combustion compartment is independently sealed as heretofore pointed out. Further as shown in FIGURES 1 and 2 the combustion fuel for the driving the rotor is introduced through a suitable inlet port port 70 which is connected to a manifold pipe 71 of a conventional carburetor 72. The latter is equipped with an air cleaner 73 such as is commonly employed for operating internal combustion engines. An exhaust outlet or port 75, as shown in FIGURES 1 and 2, is provided in the rotary casing 12 over which the combustion chambers are moved during operation of the engine. The inlet port 70 is spaced from the exhaust outlet 75 a predetermined distance, such that the exhaust port will be closed immediately before the forward compression blade moves past the inlet port 70 as the rotor rotates.

In FIGURES 1 and 2 the periphery of the rotor is provided with a cutaway portion 80 which forms a pocket for the gaseous fuel under compression as the rotor rotates. This pocket confines the fuel so that it forms a high compression chamber of fuel. The rotor is arranged to rotate in a counterclockwise direction as shown by the arrows in FIGURE 2. A spark plug 78 is arranged in the lower part of the casing of the rotor for igniting the fuel at the position where the rotor has substantially completed compression of the fuel, the position of the spark plug as illustrated in FIGURE 2 and which in the illustration is shown near the bottom of the rotor casing 12.

In the preferred embodiment illustrated in the drawings each combustion chamber or compartment of the rotor will be filled with a combustion fuel mixture and compressed as the rotor rotates in the casing, the fuel being ignited at approximately dead-center by operation of the spark plug as the rotor moves the compressed fuel charge in position to be ignited. The rotor, as shown in FIGURE 2, is offset in a vertical axial plane which passes through the center of the rotor shaft. This offsetting or eccentricity is a small fraction and generally on the order of $9/16$ of an inch between the rotor and the top side of the casing and approximately $1/16$ of an inch from the bottom side of the casing. The rotor is also offset in a horizontal plane passing through the center of the chamber 17, the rotor being $3/32$ of an inch nearing the casing on the lift side. This offsetting or eccentricity of the rotor reduces the volume of the chambers during their suction and compression strokes.

During operation of the rotary engine fuel is drawn into the combustion chambers as the rotor and compression blade mechanism rotates in the casing, the fuel being ignited at the end of the compressive rotary movement and as the compressed combustible mixture in each of the combustion chambers passes the spark plug. Preferably about $9/10$ of the intake fuel mixture is compressed into the cutaway chamber portion 80 at the time of ignition. At such a time the cutaway chamber 80 will be just to the right of the vertical plane as viewed in FIGURE 2 so that the force developed by the burning of the fuel will be exerted in a direction to rotate the rotor counterclockwise. In this way there is no back pressure force tending to turn the rotor in the opposite direction.

In the improved rotary engine structure of my invention as described and illustrated, the combustion chambers of compartments are never connected with the exhaust port and intake port at the same time. Further, due to the improved sealing means employed and described and which are substantially self-lubricating, the combustion chambers are individually sealed at all times except when connected to either the intake fuel port or exhaust port.

Such a rotary engine structure makes possible the use of a supercharger or blower at the intake thus also enabling diesel operation, if desired, which provides a rotary internal combustion engine having a greater utility than otherwise would be possible.

Another important feature of the invention is the provision of a yieldable compression blade or blades and associated side and rotor sealing elements as described which are of such dimensions that, even when the same are shifted to their outermost position during rotation of the rotor, there is still retained in the guide sleeves, grooves approximately twice the length of the extended portion. This construction entirely eliminates any tendency for the compression blades or sealing members to bind during operation of the rotary engine which would greatly effect its efficiency and render the same difficult to operate.

For the purposes of illustrating the invention a rotary engine having six compressive chambers, has been shown. However, this number of chambers is not critical and there may be a greater or less number of chambers provided.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary internal combustion engine comprising a casing having therein a cylindrical working chamber including a cylindrical peripheral side wall and a pair of circular end walls connected thereto, a rotor journaled in said casing for rotation about an axis eccentric to said cylindrical wall whereby to variably space the adjacent peripheral surfaces of the rotor and cylindrical wall throughout their circumferences, said rotor having an axial bore opening inwardly from one end of the rotor for the flow of lubricant thereinto, said rotor having circumferentially spaced pairs of diametrically opposed slots extending inwardly from the periphery of said rotor and having bottom walls spaced from said axial bore, said rotor having circumferentially spaced pairs of axially spaced radial bores, each of said pair of radial bores establishing communication between said axial bore and one of said slots through the bottom wall of the latter, a compression blade slidably disposed in each slot and projectible therefrom into continuous sealing engagement with said cylindrical side wall, said blades defining with said casing side and end walls a plurality of circumferentially spaced combustion chambers, fuel supply, exhaust and ignition means on said casing cooperating with said combustion chambers, each blade having a pair of guide bores opening into the associated slot adjacent its bottom wall and alined with the radial bores of said associated slot, a pair of guide rods for each pair of diametrically opposed blades, each guide rod being slidably disposed in the aligned radial bores of said rotor and the aligned guide bores in the associated blades, a spring embracing each guide rod and extending through said axial bore and abutting the adjacent ends of the pair of associated blades.

2. The combination of claim 1 including sealing means on the opposite sides of said rotor cooperating with said compression blades, said rotor and said end walls.

3. The combination of claim 2 wherein said sealing means includes pairs of channel-shaped sealing strips each embracing the radial edge of a blade and having a sealing engagement with the adjacent casing end wall.

4. The combination of claim 3 including transverse sealing elements carried by said rotor opposite sides and each extending between and sealingly engaging the adjacent pair of sealing strips and the associated end wall.

5. The combination of claim 1 wherein said casing end walls have central openings therethrough and outwardly projecting annular ribs concentrically surrounding said openings, said rotor having diametrically reduced extremities extending through said openings and bearings journaling said extremities within said cylindrical ribs.

6. The combination of claim 5 including a closure plate secured to the rib which is adjacent the open end of said axial bore and retaining the associated bearing.

7. The combination of claim 6 including lubricant supply passage means on said closure plate for establishing communication of said axial bore with a source of lubricant.

8. The combination of claim 1 including a closure plate secured to said casing for the open end of said axial bore, lubricant supply passage means on said closure plate for establishing communication of said axial bore with a source of lubricant supply.

References Cited in the file of this patent

UNITED STATES PATENTS

| | | |
|---|---|---|
| 54,581 | Morris | May 8, 1866 |
| 256,781 | Winkler | Apr. 18, 1882 |
| 628,989 | Penn | July 18, 1899 |
| 695,006 | Stowell | Mar. 11, 1902 |
| 718,198 | Elgen | Jan. 13, 1903 |
| 786,143 | Norton | Mar. 28, 1905 |
| 1,006,063 | Clarke | Oct. 17, 1911 |
| 1,050,300 | Rust | Jan. 14, 1913 |
| 1,119,699 | Houser | Dec. 1, 1914 |
| 1,121,628 | Hoffmann | Dec. 22, 1914 |
| 1,350,231 | McFarland | Aug. 17, 1920 |
| 1,366,138 | Traudt | Jan. 18, 1921 |
| 1,427,692 | Mahon et al. | Aug. 29, 1922 |
| 1,776,452 | Rosenthal | Sept. 23, 1930 |
| 1,808,084 | Tidd | June 2, 1931 |
| 2,193,178 | Laythorpe | Mar. 12, 1940 |
| 2,345,561 | Allen | Apr. 4, 1944 |
| 2,520,087 | Helmrich | Aug. 22, 1950 |
| 2,722,201 | Muse | Nov. 1, 1955 |
| 2,728,330 | Petersen | Dec. 27, 1955 |
| 2,877,947 | Wessling et al. | Mar. 17, 1959 |

FOREIGN PATENTS

| | | |
|---|---|---|
| 58,964 | France | Dec. 2, 1953 |
| | (Addition to 978,559) | |
| 391,225 | France | Aug. 24, 1908 |
| 493,844 | France | May 14, 1919 |
| 551,263 | France | Jan. 4, 1923 |
| 589,699 | France | Feb. 26, 1925 |
| 720,373 | France | Dec. 3, 1931 |
| 808,798 | France | Nov. 24, 1936 |
| 1,031,936 | France | Mar. 25, 1953 |
| 1,191,555 | France | Apr. 13, 1959 |
| 1,226,573 | France | Feb. 29, 1960 |
| 420,860 | Great Britain | Dec. 10, 1934 |
| 656,229 | Germany | Feb. 7, 1938 |
| 432,912 | Italy | Mar. 30, 1948 |
| 545,067 | Belgium | Feb. 29, 1956 |